(12) United States Patent
Shudo

(10) Patent No.: US 7,729,000 B2
(45) Date of Patent: Jun. 1, 2010

(54) IMAGE FORMING APPARATUS PERFORMING IMAGE FORMATION ON PRINT DATA, IMAGE PROCESSING SYSTEM INCLUDING PLURALITY OF IMAGE FORMING APPARATUSES, PRINT DATA OUTPUT METHOD EXECUTED ON IMAGE FORMING APPARATUS, AND PRINT DATA OUTPUT PROGRAM PRODUCT

(75) Inventor: Takao Shudo, Kobe (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 889 days.

(21) Appl. No.: 11/585,808

(22) Filed: Oct. 25, 2006

(65) Prior Publication Data
US 2007/0253013 A1 Nov. 1, 2007

(30) Foreign Application Priority Data
Apr. 29, 2006 (JP) .............................. 2006-127135

(51) Int. Cl.
*G06F 15/00* (2006.01)
*G06F 15/16* (2006.01)
(52) U.S. Cl. ..................................... 358/1.15; 709/229
(58) Field of Classification Search ................ 358/1.15, 358/1.9, 1.13, 1.14, 1.16, 1.18, 400, 448; 713/168, 182, 189, 193; 709/227, 229, 231, 709/244; 455/456.6; 715/771, 743, 741, 715/719
See application file for complete search history.

(56) References Cited

U.S. PATENT DOCUMENTS

| | | | |
|---|---|---|---|
| 6,088,119 A | 7/2000 | Manchala et al. | |
| 6,108,103 A | 8/2000 | Kurozasa | |
| 6,163,383 A | 12/2000 | Ota et al. | |
| 6,950,200 B1 | 9/2005 | Yamada et al. | |
| 7,016,063 B2 | 3/2006 | Hama | |
| 2008/0034209 A1* | 2/2008 | Dickinson et al. ........... | 713/168 |

FOREIGN PATENT DOCUMENTS

| | | |
|---|---|---|
| JP | 06-124177 | 5/1994 |
| JP | 2001-047700 | 2/2001 |
| JP | 2002-149385 | 5/2002 |
| JP | 2003-87458 | 3/2003 |
| JP | 2003-263289 | 9/2003 |
| JP | 2004-98413 | 4/2004 |
| JP | 2004-118464 | 4/2004 |
| JP | 2005-167616 | 6/2005 |

OTHER PUBLICATIONS

Notice of Ground of Rejection mailed on Jun. 10, 2008 directed to JP-2006-127135.
Japanese Office Action mailed on Apr. 14, 2009 directed at counterpart application No. 2006-127135; 6 pages.

* cited by examiner

Primary Examiner—Saeid Ebrahimi Dehkordy
(74) Attorney, Agent, or Firm—Morrison & Foerster LLP

(57) ABSTRACT

In order to prevent leakage of confidential information, MFP includes a communication I/F to receive print data, an image forming portion to perform image formation on print data, and a CPU to prohibit the image forming portion from performing image formation on the print data before the print data is subjected to image formation by the image forming portion, when a prescribed time has passed since the print data was received or when an input of an instruction to protect the print data is accepted, and to store the print data in a storage device, and to allow the image forming portion to perform image formation on the print data in response to accepting a log-in instruction.

8 Claims, 9 Drawing Sheets

FIG. 3A
FIG. 3B
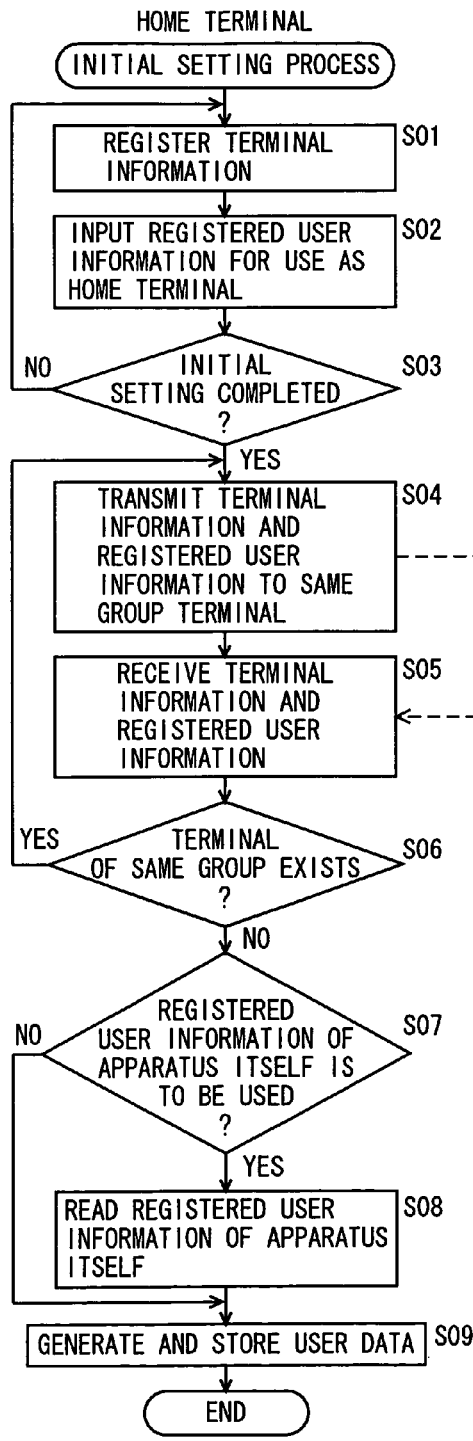
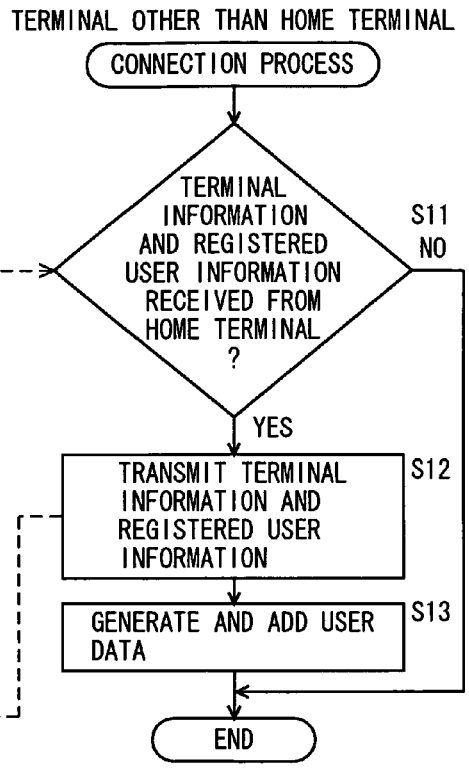

FIG. 4A

REGISTERED USER INFORMATION OF MFP 100

| NUMBER | USER IDENTIFICATION INFORMATION | DIVISION NAME | E-mail ADDRESS | FACE IMAGE | PASSWORD |
|---|---|---|---|---|---|
| 1 | DAVID | SECRETARIAT | david@xxx.jp | david.jpg | xxx |

FIG. 4B

REGISTERED USER INFORMATION OF MFP 100A

| NUMBER | USER IDENTIFICATION INFORMATION | DIVISION NAME | E-mail ADDRESS | FACE IMAGE | PASSWORD |
|---|---|---|---|---|---|
| 2 | JULIE | PLANNING DIVISION | julie@xxx.jp | julie.jpg | xxxx |

FIG. 4C

REGISTERED USER INFORMATION OF MFP 100B

| NUMBER | USER IDENTIFICATION INFORMATION | DIVISION NAME | E-mail ADDRESS | FACE IMAGE | PASSWORD |
|---|---|---|---|---|---|
| 3 | TED | GENERAL AFFAIRS DIVISION | ted@xxx.jp | ted.jpg | xxxxx |

FIG. 4D

REGISTERED USER INFORMATION OF MFP 100C

| NUMBER | USER IDENTIFICATION INFORMATION | DIVISION NAME | E-mail ADDRESS | FACE IMAGE | PASSWORD |
|---|---|---|---|---|---|
| 4 | MICHAEL | DEVELOPMENT DIVISION | michael@xxx.jp | michael.jpg | xxxxx |
| 5 | SUSAN | RESEARCH DIVISION | susan@xxx.jp | susan.jpg | xxxxxx |

F I G. 4 E

FIRST USER DATA OF MFP 100

| NUMBER | USER IDENTIFICATION INFORMATION | DIVISION NAME | E-mail ADDRESS | FACE IMAGE | PASSWORD | HOME TERMINAL | INSTALLATION PLACE OF HOME TERMINAL |
|---|---|---|---|---|---|---|---|
| 1 | DAVID | SECRETARIAT | david@xxx.jp | david.jpg | xxx | IP ADDRESS OF MFP 100 | 19F COPY ROOM |
| 2 | JULIE | PLANNING DIVISION | julie@xxx.jp | julie.jpg | xxxx | IP ADDRESS OF MFP 100A | 5F PLANNING DIVISION |
| 3 | TED | GENERAL AFFAIRS DIVISION | ted@xxx.jp | ted.jpg | xxxxx | IP ADDRESS OF MFP 100B | 4F MEETING ROOM |
| 4 | MICHAEL | DEVELOPMENT DIVISION | michael@xxx.jp | michael.jpg | xxxxx | IP ADDRESS OF MFP 100C | 14F MEETING ROOM |
| 5 | SUSAN | RESEARCH DIVISION | susan@xxx.jp | susan.jpg | xxxxxx | IP ADDRESS OF MFP 100C | 7F LABORATORY |

F I G. 4 F

SECOND USER DATA OF MFP 100

| NUMBER | USER IDENTIFICATION INFORMATION | DIVISION NAME | E-mail ADDRESS | FACE IMAGE | PASSWORD | HOME TERMINAL | INSTALLATION PLACE OF HOME TERMINAL |
|---|---|---|---|---|---|---|---|
| 2 | JULIE | PLANNING DIVISION | julie@xxx.jp | julie.jpg | xxxx | IP ADDRESS OF MFP 100A | 5F PLANNING DIVISION |
| 3 | TED | GENERAL AFFAIRS DIVISION | ted@xxx.jp | ted.jpg | xxxxx | IP ADDRESS OF MFP 100B | 4F MEETING ROOM |
| 4 | MICHAEL | DEVELOPMENT DIVISION | michael@xxx.jp | michael.jpg | xxxxx | IP ADDRESS OF MFP 100C | 14F MEETING ROOM |
| 5 | SUSAN | RESEARCH DIVISION | susan@xxx.jp | susan.jpg | xxxxxx | IP ADDRESS OF MFP 100C | 7F LABORATORY |

FIG. 8

| JOB NUMBER | USER IDENTIFICATION INFORMATION | PASSWORD | ACCEPTING DATE AND TIME | JOB INFORMATION | INSTANT EXECUTION JOB |
|---|---|---|---|---|---|
| 1 | DAVID | ××× | 2006/4/1/11:00 | A4 DOUBLE-SIDED COLOR, 20 COPIES | |
| 2 | DAVID | ××× | 2006/4/2/12:00 | A3 DOUBLE-SIDED COLOR, 2 COPIES | * |
| 3 | DAVID | ××× | 2006/4/3/13:00 | A4 SINGLE-SIDED MONOCHROME, 1 COPY | |
| 4 | DAVID | ××× | 2006/4/4/14:00 | A4 DOUBLE-SIDED COLOR, 1 COPY | * |
| 5 | DAVID | ××× | 2006/4/5/15:00 | A4 2-IN-1 COLOR, 3 COPIES | |
| 6 | DAVID | ××× | 2006/4/6/16:00 | A3 SINGLE-SIDED MONOCHROME, 10 COPIES | |

IMAGE FORMING APPARATUS PERFORMING IMAGE FORMATION ON PRINT DATA, IMAGE PROCESSING SYSTEM INCLUDING PLURALITY OF IMAGE FORMING APPARATUSES, PRINT DATA OUTPUT METHOD EXECUTED ON IMAGE FORMING APPARATUS, AND PRINT DATA OUTPUT PROGRAM PRODUCT

This application is based on Japanese Patent Application No. 2006-127135 filed with Japan Patent Office on Apr. 29, 2006, the entire content of which is hereby incorporated by reference.

BACKGROUND OF THE INVENTION

1. Field of the Invention

The present invention relates to an image forming apparatus, an image processing system, a print data output method, and a print data output program product. More particularly, the present invention relates to an image forming apparatus performing image formation on print data, an image processing system including a plurality of image forming apparatuses, a print data output method executed on the image forming apparatus, and a print data output program product.

2. Description of the Related Art

Recently, image forming apparatuses such as printers are generally used in such a manner that they are connected to a network. In this manner, an image forming apparatus is shared by a plurality of users. Therefore, when a user allows a computer connected to a network to transmit print data to an image forming apparatus which is installed at a location distant from the computer, another user can pick up paper having an image formed thereon by the image forming apparatus before the user does. In order to cope with this problem, the image forming apparatus includes a confidential print function that prevents print data from undergoing image formation before a password received with the print data is input. In this confidential print function, the image forming apparatus is allowed to perform image formation in the state in which the user who allows the computer to transmit print data is in the vicinity of the image forming apparatus, thereby preventing paper having an image formed thereon from being examined by other people. In order to allow the image forming apparatus to do printing with this confidential print function set valid, it is necessary to input an instruction into a computer to transmit a password together with print data. Thus, if a user fails to input such an instruction, print data is subjected to image formation even in the absence of the user in the vicinity of the image forming apparatus, and confidentiality thus cannot be preserved.

Japanese Laid-Open Patent Publication No. 6-124177 discloses a scheme of protecting an output of secret print data. In this scheme, an output attribute of transmission print data stored in first storage means and secret condition data set and input beforehand for each user are compared with each other. Print data having an output attribute that does not agree with the secret condition data is allowed to be output by printing means while print data having an output attribute that agrees with the secret condition data is determined as secret print data and then prevented from being output to the printing means. The output attribute of the secret print data and the secret condition are compared with each other according to an input of user password data to display input means, and the secret print data that agrees with the secret condition data is allowed to be output by the printing means. In the output protection scheme disclosed in Japanese Laid-Open Patent Publication No. 6-123177, however, secret condition data has to be set beforehand for each user. Moreover, print data that does not agree with the secret condition data is not protected.

On the other hand, Japanese Laid-Open Patent Publication No. 2001-47700 discloses an image processing apparatus characterized in that an unprocessed job to be processed and a job being processed, which have already been accepted by a control portion, are stored in a removable recording medium when a fatal failure occurs in an image input/output apparatus, and the job stored in the recording medium is read for execution by a control portion of another image input/output apparatus having the recording medium attached thereto by a user. In the image forming apparatus disclosed in Japanese Laid-Open Patent Publication No. 2001-47700, without a fatal failure, a job is executed so that paper is output even when a user is not present in the vicinity of the image input/output device. Accordingly, confidentiality cannot be preserved.

SUMMARY OF THE INVENTION

The present invention is made to solve the aforementioned problem. An object of the present invention is to provide an image forming apparatus in which leakage of confidential information is prevented.

Another object of the present invention is to provide an image forming system in which leakage of confidential information is prevented.

A further object of the present invention is to provide a print data output method in which leakage of confidential information is prevented.

Yet another object of the present invention is to provide a print data output program product in which leakage of confidential information is prevented.

In order to solve the aforementioned problem, in accordance with an aspect of the present invention, an image forming apparatus includes: a print data reception portion to receive print data; an image forming portion to perform image formation on print data; a prohibition portion to prohibit the image forming portion from performing image formation on the received print data and store the received print data in a storage device before the received print data is subjected to image formation by the image forming portion, when a prescribed time has passed since the print data was received or when an input of an instruction to protect the print data is accepted; a print instruction accepting portion to accept an input of a print instruction; and an output portion to allow the image forming portion to perform image formation on the stored print data in response to accepting the input of a print instruction.

In accordance with this aspect, image formation of print data is prohibited and print data is stored in a storage device before the received print data is subjected to image formation when a prescribed time has passed after the print data was received or when an input of an instruction to protect print data is accepted. Therefore, if print data has not yet been output when a user who gave an instruction to transmit print data goes to an image forming apparatus believing that print data was subjected to image formation, print data will not be subjected to image formation even if the user thereafter moves away from the image forming apparatus. Therefore, it is possible to prevent paper having print data subjected to image formation from being seen by other people. In addition, upon acceptance of an input of a print instruction, print data is subjected to image formation, so that the user who gave an instruction to transmit print data can pick up paper having print data subjected to image formation when moving to the installation place of the image forming apparatus later. As a result, it is possible to provide an image forming apparatus in which leakage of confidential information is prevented.

In accordance with another aspect of the present invention, an image processing system includes a plurality of image forming apparatuses each connected to a network. Each of the plurality of image forming apparatuses includes: a print data reception portion to receive print data and user identification information for identifying a user; an image forming portion to perform image formation on print data; a prohibition portion to prohibit the image forming portion from performing image formation on the received print data, relate the print data with the user identification information received together with the print data, and store the received print data in a storage device before the received print data is subjected to image formation by the image forming portion, when a prescribed time has passed since the print data was received or when an input of an instruction to protect the print data is accepted; an operation accepting portion to accept an input of an operation by a user; an authentication portion to authenticate the user identification information accepted by the operation accepting portion; a print data obtaining portion to obtain print data related with the authenticated user identification information from another image forming apparatus connected via the network; and an output portion to allow the image forming portion to perform image formation on the print data obtained by the print data obtaining portion.

In accordance with this aspect, it is possible to provide an image processing system in which leakage of confidential information is prevented.

In accordance with a further aspect of the present invention, a print data output method is executed in an image forming apparatus including a storage device and an image forming portion to perform image formation on print data. The method includes the steps of: receiving print data; prohibiting the image forming portion from performing image formation on the received print data before the received print data is subjected to image formation by the image forming portion, when a prescribed time has passed since the print data was received or when an input of an instruction to protect the print data is accepted; storing the received print data into the storage device; accepting an input of a print instruction; and allowing the image forming portion to perform image formation on the stored print data in response to accepting the input of a print instruction.

In accordance with this aspect, it is possible to provide a print data output method in which leakage of confidential information is prevented.

In accordance with yet another aspect of the present invention, a print data output method is executed in each of a plurality of image forming apparatuses connected to a network. Each of the plurality of image forming apparatuses includes a storage device, and an image forming portion to perform image formation on print data. The method includes the steps of: in inputting print data, receiving print data and user identification information for identifying a user; prohibiting the image forming portion from performing image formation on the received print data before the received print data is subjected to image formation by the image forming portion, when a prescribed time has passed since the print data was received or when an input of an instruction to protect the print data is accepted; and relating the print data with the user identification information received together with the print data and storing the received print data; and in outputting print data, accepting an input of user identification information; authenticating the accepted user identification information; obtaining the print data related with the authenticated user identification information from another image forming apparatus connected via the network; and allowing the image forming portion to perform image formation on the obtained print data.

In accordance with this aspect, it is possible to provide a print data output method in which leakage of confidential information is prevented.

In accordance with a still further aspect of the present invention, a print data output program product is executed in an image forming apparatus including a storage device and an image forming portion to perform image formation on print data. The program product causes the image forming apparatus to execute the steps of receiving print data; prohibiting the image forming portion from performing image formation on the received print data before the received print data is subjected to image formation by the image forming portion, when a prescribed time has passed since the print data was received or when an input of an instruction to protect the print data is accepted; storing the received print data into the storage device; accepting an input of a print instruction; and allowing the image forming portion to perform image formation on the stored print data in response to accepting the input of a print instruction.

In accordance with this aspect, it is possible to provide a print data output program product in which leakage of confidential information is prevented.

In accordance with a further aspect of the present invention, a print data output program product is executed in each of a plurality of image forming apparatuses connected to a network. Each of the plurality of image forming apparatuses includes a storage device, and an image forming portion to perform image formation on print data. The program product causes the image forming apparatus to execute the steps of: in inputting print data, receiving print data and user identification information for identifying a user; prohibiting the image forming portion from performing image formation on the received print data before the received print data is subjected to image formation by the image forming portion, when a prescribed time has passed since the print data was received or when an input of an instruction to protect the print data is accepted; and relating the print data with the user identification information received together with the print data and storing the received print data; and in outputting print data, accepting an input of user identification information; authenticating the accepted user identification information; obtaining the print data related with the authenticated user identification information from another image forming apparatus connected via the network; and allowing the image forming portion to perform image formation on the obtained print data.

In accordance with this aspect, it is possible to provide a print data output program product in which leakage of confidential information is prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3A is a flowchart illustrating an exemplary flow of an initial setting process.

FIG. 3B is a flowchart illustrating an exemplary flow of a connection process.

FIG. 4A to FIG. 4F are diagrams illustrating registered user information and first and second user data.

FIG. 8 is a diagram showing an exemplary a job management table.

DESCRIPTION OF THE PREFERRED EMBODIMENT

Figure 1:
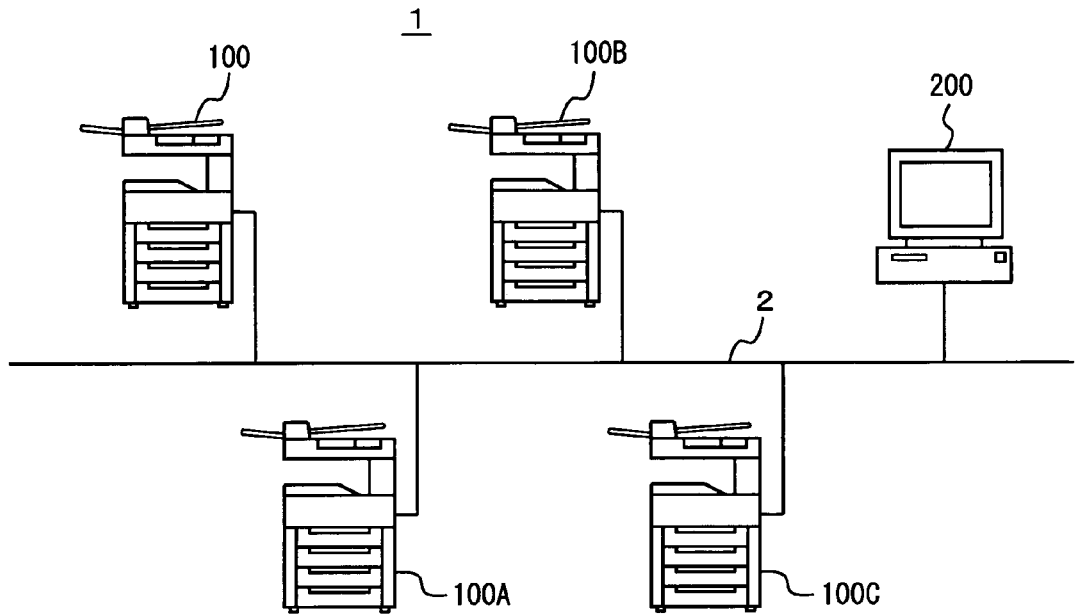
FIG. 1 is an overall schematic diagram of a image processing system according to an embodiment of the present invention.

The embodiment of the present invention will be described below with reference to the drawings. In the following description, the same or corresponding parts are denoted by the same reference characters. Their names and function are also the same. Thus, a detailed description thereof will not be repeated.

FIG. 1 is an overall schematic diagram showing a image processing system according to an embodiment of the present invention. With reference to FIG. 1, an image processing system 1 includes multi function peripherals (referred to as "MFP" hereinafter) 100, 100A, 100B, and 100C and a personal computer (referred to as "PC" hereinafter), each connected to a network 2. The configuration and the function of MFP 100, 100A, 100B, and 100C are the same, and therefore MFP 100 will be described here as an example unless otherwise noted.

MFP (Multi Function Peripheral) 100 includes a scanner for scanning a sheet of original manuscript, an image forming portion for forming an image on recording media such as a sheet of paper based on image data, and a facsimile, and has an image scanning function, a copying function, and a facsimile transmission and reception function. Moreover, although MFP 100 is described as an example in the this embodiment, MFP 100 can be replaced by, for instance, a printer, a facsimile, and the like including an image forming function.

Network 2 is a local area network (LAN) and the form of connection can be fixed-line or wireless. In addition, network 2 is not limited to a LAN and can be a wide area network (WAN), the Internet, and so on. MFPs 100, 100A, 100B, and 100C can communicate with each other via network 2. In addition, MFPs 100, 100A, 100B, 100C each can communicate with PC 200 connected via network 2.

PC 200 is a general computer. The hardware configuration and the function of PC 200 are well known and therefore description thereof will not be repeated here. PC 200 at least has a printer driver program installed therein for controlling each of MFPs 100, 100A, 100B, and 100C. At least user identification information for identifying a user of PC 200 is registered in the printer driver program. When the printer driver program is executed in PC 200, PC 200 transmit to any of MFPs 100, 100A, 100B, 100C a print job including data generated by executing an application program different from the printer driver program. The print job includes print data and job information.

Print data is data produced by converting the data generated by executing an application program into print data described, for example, in PDL (Page Description Language) such as PCL (Printer Control Language). Job information is data of image formation conditions and the like, such as user identification information registered in the printer driver program and number of copies, described for example in PJL (Printer Job Language). For example, if PC 200 transmits a print job to MFP 100, MFP 100 performs image formation on print data according to job information in the print job.

It is noted that in the following description, PC 200 transmits a print job to MFP 100 by way of example, unless otherwise specified. In this case, MFP 100 receives a print job from PC 200 to perform image formation on print data included in the print job according to job information.

It is noted that FIG. 1 shows one PC 200. However, the number of PCs is not limited and one or more PCs may be connected to network 2.

Figure 2:
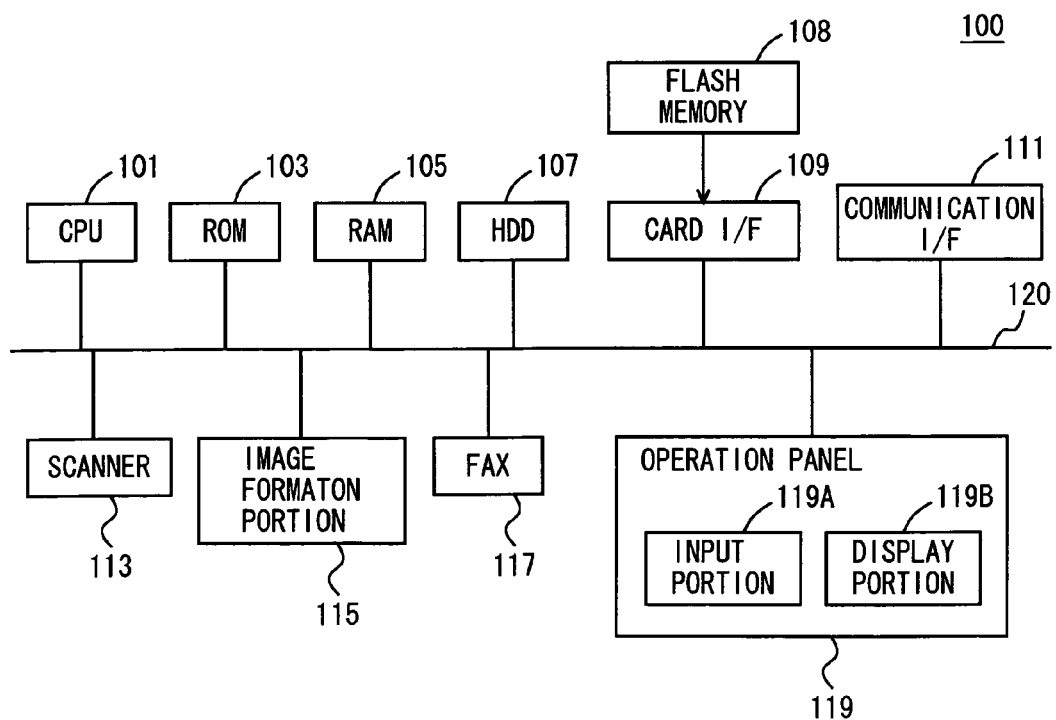
FIG. 2 is a block diagram showing an exemplary hardware configuration of an MFP according to the present embodiment.

FIG. 2 is a block diagram showing an exemplary hardware configuration of MFP 100 according to this embodiment. With reference to FIG. 2, MFP 100 includes, each connected to a bus 120, a central processing unit (CPU) 101, a ROM (Read Only Memory) 103 that stores a program or the like to be executed by CPU 101, a RAM (Random Access Memory) 105 for loading a program to be executed and for storing data during execution of the program, a hard disk drive (HDD) 107 for storing data in a nonvolatile manner, a card interface (I/F) 109 to which a flash memory 108 is attached, a communication I/F 111 for connecting MFP 100 to network 2, a scanner 113, an image forming portion 115, a facsimile (FAX) 117, and an operation panel 119 as an interface with a user.

CPU 101 loads into RAM 105 and executes a print data output program stored in flash memory 108 attached to card I/F 109. Moreover, the program executed by CPU 101 is not limited to the print data output program stored in flash memory 108, and a program stored in an EEPROM (Electrically Erasable/Programmable Read Only Memory) connected additionally to CPU 101 can be loaded into RAM 105 and be executed. The use of an EEPROM makes it possible to rewrite or additionally write a print data output program. Thus, another computer connected to network 2 can rewrite the print data output program stored in the EEPROM of MFP 100 or additionally write a new print data output program into the EEPROM. Furthermore, MFP 100 can download a print data output program from another computer connected to network 2 and store the print data output program in an EEPROM.

Moreover, these programs may not always be read from flash memory 108 for execution. The program stored in ROM 103 may be read. Furthermore, by saving a print data output program stored in the flash memory into HDD 107 first, the program can be loaded from HDD 107 into RAM 105 and be executed. The program referred to here not only includes a program directly executable by CPU 101, but also a source program, a compressed program, an encrypted program, and the like.

Image forming portion 115 is a laser printer, an ink jet printer, or the like, and makes image data visible on recording media such as a sheet of paper. Scanner 113 includes a photoelectric transducer such as a CCD (Charge Coupled Device) and the like, and optically reads a sheet of original manuscript and outputs electronic data that is the image data. FAX 117 transmits and receives the image data according to the facsimile protocol via Public Switched Telephone Network (PSTN).

Operation panel 119 includes an input portion 119A and a display portion 119B. Input portion 119A is an input device such as a touch panel, a keyboard, or a mouse for accepting an input of operation by a user of MFP 100. Display portion 119B is a liquid crystal display or an organic EL (Electro-Luminescence) display panel. When using a touch panel formed of a transparent member for input portion 119A, the touch panel is provided to overlap display portion 119B so that an instruction to a button displayed on display portion 119B can be detected. Thus, input of a variety of operations becomes possible.

Communication I/F 111 is a communication interface for connecting MFP 100 to network 2. MFP 100 can communicate with PC 200 and other MFPs 100A, 100B, 100C. Although MFP 100 is connected to other MFPs 100A, 100B, and 100C via network 2, it can also be connected directly using a serial interface or a parallel interface. Communication I/F 111 uses an interface that corresponds to the form of connection between MFP 100 and other MFPs 100A, 100B, and 100C.

The input of data into MFP 100 includes the following cases: (1) when scanner 113 scans a sheet of original manuscript and the image data is input; (2) when image data is received from another computer or from other MFPs 100A, 100B, and 100C connected to network 2 via communication I/F; (3) when image data stored in flash memory 108 is read via card I/F; and (4) when facsimile data is received in FAX 117.

The output of data from MFP 100 includes the following cases: (1) data is made visible on recording media such as a sheet of paper by image forming portion 115; (2) data is transmitted to another computer or to other MFPs 100A, 100B, and 100C connected to the network via communication I/F 111; (3) data is stored in flash memory 108; (4) data is output as facsimile data by FAX 117; and (5) data is displayed on display portion 119B.

Moreover, a storage medium that stores a print data output program is not limited to flash memory 108 and can also be media such as a flexible disk, a cassette tape, an optical disk (CD-ROM (Compact Disc-ROM)/MO (Magnetic Optical Disc)/MD (Mini Disc)/DVD (Digital Versatile Disc)), an IC card (including a memory card), an optical card, and a semiconductor memory such as a mask ROM, an EPROM (Erasable Programmable ROM), an EEPROM (Electronically Erasable and Programmable ROM).

In image processing system 1 according to this embodiment, for each of MFPs 100, 100A, 100B, and 100C, a user who mainly uses the apparatus is fixed. Thus, each of MFPs 100, 100A, 100B, and 100C stores registered user information in order to register the user who mainly uses it. The registered user information, which will be described later, includes at least user identification information for identifying a user and a password as authentication information. The name of the user can be used as the user identification information. Here, based on the user, any one or more of MFPs 100, 100A, 100B, and 100C which store the registered user information of that user are referred to as "home terminals." For instance, if the registered user information of the user "David" is stored in MFP 100, a home terminal of the user "David" is MFP 100. Moreover, registered user information is stored in each of MFPs 100, 100A, 100B, and 100C to define a user who mainly uses the apparatus but not to prohibit the user whose registered user information is not stored therein from using it.

Furthermore, each of MFPs 100, 100A, 100B, 100C store user data including registered user information stored in all the other MPS such that a user having his registered user information stored in a home terminal can log in a terminal other than the home terminal. In the user data, user identification information is related with apparatus identification information of a home terminal.

Here, a process of generating user data will be described. It is assumed that MFP 100 is newly connected to network 2 where MFPs 100A, 100B, and 100C have already been connected network 2. For MFP 100, it is necessary to set apparatus identification information for identifying MFP 100 and the above-described registered user information. When the apparatus identification information and the registered user information are set for MFP 100, MFP 100 transmits the apparatus identification information and the registered user information to other MFPs 100A, 100B, and 100C. Thus, image processing system 1 configured with MFPs 100, 100A, 100B, and 100C is formed.

FIG. 3A is a flowchart illustrating an exemplary flow of an initial setting process. The initial setting process is executed in MFP 100 when MFP 100 is newly connected to network 2. FIG. 3B is a flowchart illustrating an exemplary flow of a connection process. The connection process is executed in each of MFPs 100A, 100B, and 100C already connected to network 2 when MFP 100 is newly connected to network 2. The initial setting process and the connection process are implemented by having an initial setting program and a connection program that are stored in flash memory 108 loaded into RAM 105 and executed by CPU 101, in each of MFPs 100, 100A, 100B, and 100C. The initial setting program and the connection program are a part of the print data output program.

With reference to FIG. 3A, terminal information is registered in MFP 100 (step S01). The terminal information is accepted by MFP 100 and registered by the user inputting the terminal information to operation panel 119 according to a terminal registration window appearing on display portion 119B. The terminal information at least includes apparatus identification information for identifying MFP 100. The apparatus identification information is preferably location information assigned to MFP 100 in network 2, and is here an IP (Internet Protocol) address. The terminal information can include information showing the location where MFP 100 is disposed.

Next, registered user information of a user who uses MFP 100 as a home terminal is input into MFP 100 (step S02). The registered user information is accepted by MFP 100 by the user inputting the registered user information to operation panel 119 according to a registered user information input window appearing on display portion 119B. When a plurality of users use MFP 100 as a home terminal, registered user information of each of the plurality of users is input. The registered user information at least includes user identification information for identifying the user. The user identification information needs only to be unique information such as a user ID including characters or symbols and a name of the user. Here, a user name is used as the user identification information. The registered user information can also include accompanying information and authentication information in addition to the user identification information.

The user inputs the terminal information, and upon completion of the user registration process, the user gives an instruction to input portion 119A on a completion button displayed on display portion 119B, so that it is detected in MFP 100 that the initial setting has been completed. The registration of the terminal information in step S01 and the input of the registered user information in step S02 are usually performed by the administrator of the terminal.

Then, it is determined whether the initial setting is completed or not (step S03). If the initial setting is completed, the process proceeds to step S04, and if it is not completed, the process goes back to step S01. In step S04, the terminal information and the registered user information for which initial setting has already been performed are transmitted to the terminals in the same group. The same group refers to a set of terminals which form image processing system 1. Here, MFPs 100, 100A, 100B, and 100C connected to network 2 are considered to be of the same group. Thus, by transmitting an inquiry by broadcast on network 2, MFP 100 receives the IP addresses of terminals respectively transmitted back from MFPs 100A, 100B, and 100C in the same group in response to the inquiry. In this manner, the IP addresses of the terminals that form the same group are obtained. Moreover, by grouping, a plurality of terminals connected to network 2 can be divided into different groups. For instance, MFPs 100 and 100A can form one group, while MFPs 100B and 100C can form another group. Such grouping is set by a user. More specifically, as described above, MFP 100 receives the respective IP addresses of MFPs 100A, 100B, and 100C connected to network 2 and detects MFPs 100A, 100B, and 100C, and the user designates which of MFPs 100A, 100B, and 100C should be in the same group as MFP 100, whereby an apparatus to be included in the group is specified.

MFP 100 transmits terminal information and registered user information to one terminal chosen from MFPs 100A, 100B, and 100C set as the same group. Here, MFP 100A is selected, and the terminal information and the registered user information of MFP 100 are transmitted from MFP 100 to MFP 100A, by way of example.

Now, with reference to FIG. 3B, MFP 100A receives the terminal information and the registered user information of MFP 100 transmitted from MFP 100 (step S11). In response to this reception, MFP 100A transmits to MFP 100 the terminal information and the registered user information stored in HDD 107 of MFP 100A (step S12). In other words, the connection process is a process performed on condition that a request is received from MFP 100 that performs the initial setting process. In the next step S13, user data is generated based on the terminal information and the registered user information of MFP 100 received in step S11, and the generated user data is added to user data already stored in HDD 107.

Going back to FIG. 3A, MFP 100 receives the terminal information and the registered user information of MFP 100A transmitted from MFP 100A (step S05). Then, it is determined whether or not a terminal to which the terminal information and the registered user information have not yet been transmitted exists among the terminals of the same group (step S06). If such a terminal exists, that terminal is selected and the process goes back to step S04, but if not, the process proceeds to step S07. Here, since the terminal information and the registered user information have not yet been transmitted to MFPs 100B and 100C, either of these two is selected and the process goes back to step S04. Thus, MFP 100 transmits the terminal information and the registered user information of MFP 100 to the terminals of the same group one by one (step S04), and receives from each terminal the terminal information and the registered user information of that terminal (step S05). Moreover, although, here, the terminals of the same group are selected one by one and the terminal information and the registered user information are transmitted accordingly, the terminal information and the registered user information can be transmitted by broadcast, and the terminal information and the registered user information stored in MFPs 100A, 100B, and 100C can be received from MFPs 100A, 100B, and 100C, respectively.

In step S07, it is determined whether or not the registered user information of the apparatus itself is to be used for the user data generation. This determination can be based on a selection made by a user, or it can be predetermined. If it is determined that the registered user information of the apparatus itself is to be used, the process proceeds to step S08, and if it is determined that it is not to be used, step S08 is skipped and the process proceeds to step S09. In step S08, the registered user information stored in MFP 100 is read. Then, in step S09, the user data is generated from the terminal information and the registered user information. If step S08 is skipped, user data is generated from the registered user information and the terminal information received from each of terminal MFPs 100A, 100B, 100C. If step S08 is executed, user data is generated from the registered user information received from each of terminal MFPs 100A, 100B, 100C and the registered user information stored in MFP 100 and the terminal information of each of MFPs 100, 100A, 100B, 100C. The user data includes the terminal information and the registered user information. Moreover, although the user data includes the terminal information and the registered user information in this embodiment, the user data needs only to include at least the registered user information. Here, the user data generated when MFP 100 determines that the registered user information of its own is used in step S07 is referred to as first user data, and the user data generated when MFP 100 determines that the registered user information of its own is not used in step S07 is referred to as second user data. Then, the generated user data is stored in HDD 107.

When the first user data is generated in all of MFPs 100, 100A, 100B, and 100C, all of MFPs 100, 100A, 100B, 100C store the same user data. On the other hand, when MFP 100A generates the second user data, that second user data includes user data in which terminal information of MFPs 100, 100B, 100C are related with the registered user information stored in MFPs 100, 100B, 100C, respectively. When MFP 100B generates the second user data, that second user data includes user data in which terminal information of MFPs 100, 100A, 100C are related with the registered user information stored in MFPs 100, 100A, 100C, respectively. When MFP 100C generates the second user data, that second user data includes user data in which terminal information of MFPs 100, 100A, 100B are related with the registered user information stored in MFPs 100, 100A, 100B, respectively.

Moreover, here, while the terminal information registration process and the registered user information input process are performed in the initial setting process executed in MFP 100, a process similar to this initial setting process is also executed in the case where MFP 100 has already been connected to network 2 and a user is to be added. In such a case, however, the terminal information registration process in step S01 is not required.

In addition, the initial setting process can be performed not only when each of MFPs 100, 100A, 100B, and 100C is connected to network 2 but also after the power is turned on in each of MFPs 100, 100A, 100B, and 100C, or at prescribed time intervals. For instance, when a user is newly registered in MFP 100, the registered user information of the newly registered user is transmitted to other MFPs 100A, 100B, 100C so that the latest user data is stored in other MFPs 100A, 100B, 100C. In this case, without executing steps S01 and S03 of the initial setting process shown in FIG. 3A, MFP 100 performs the registered user information input process in step S02. Accordingly, MFP 100 obtains the registered user information of the user newly registered in any other MFP 100A, 100B, 100C, conversely, in order to store the latest user data in MFP 100. In this case, without executing the process in steps S01 to S03 of the initial setting process shown in FIG. 3A, MFP 100 executes a process of requesting transmission of the registered user information from other MFPs 100A, 100B, 100C. This transmission request for the registered user information at least includes apparatus identification information. In response to this transmission request, each of other MFPs 100A, 100B, and 100C executes the connection process shown in FIG. 3B, and in step S11 in response to the transmission request being received, transmits the registered user information stored in its HDD 107 to MFP 100 that transmitted the transmission request. Thus, even when the registered user information stored in HDDs 107 of other MFPs 100A, 100B, and 100C is altered, user data will be generated from the altered registered user information and stored in HDD 107. In this case, each of MFPs 100A, 100B, 100C needs not execute step S13 in the connection process.

FIGS. 4A to 4F are diagrams illustrating the registered user information and the first and second user data. FIG. 4A is a diagram showing an example of registered user information stored in MFP 100, FIG. 4B is a diagram showing an example of registered user information stored in MFP 100A, FIG. 4C is a diagram showing an example of registered user information stored in MFP 100B, and FIG. 4D is a diagram showing an example of registered user information stored in MFP 100C. The registered user information includes user identification information, accompanying information, and authentication information. The accompanying information is the information related to a user, such as the name of the division the user belongs to, an email address assigned to that user, face image data obtained by capturing the face of that user, and so on. The authentication information is the information used for authentication of the user at log-in, and here, a password is used. It is also possible to use the face image data as the authentication information. When biometrics authentication is used, a fingerprint, sound spectrogram, iris, vein pattern, and the like are used for authentication information.

Furthermore, FIG. 4E is a diagram showing an example of first user data, and FIG. 4F is a diagram showing an example of second user data stored in MFP 100A. The first user data or the second user data is generated and stored in each of MFPs 100, 100A, 100B, 100C when the initial setting process shown in FIG. 3A is performed in MFP 100 and the connection process shown in FIG. 3B is performed in each of MFPs 100A, 100B, 100C. The first and second user data includes a number, registered user information, apparatus identification information of a home terminal, and the location where the home terminal is disposed. The user data needs only to include at least the user identification information and the apparatus identification information of a home terminal.

In this manner, when the initial setting process is executed in MFP 100, in MFPs 100, 100A, 100B, and 100C set to be of the same group, the same first user data is generated and stored, or second user data including all of the registered user information of other terminals of the same group is generated. Thus, image processing system 1 constructed by MFPs 100, 100A, 100B, and 100C is formed. When image processing system 1 is formed, the user who uses one of MFPs 100, 100A, 100B, and 100C as a home terminal can be specified based on the user data. Therefore, a user whose home terminal is any of MFPs 100, 100A, 100B, 100C inputs user identification information and a password in any of MFPs 100, 100A, 100B, 100C, so that that MFP performs authentication using user data and permits log-in.

Figure 5:
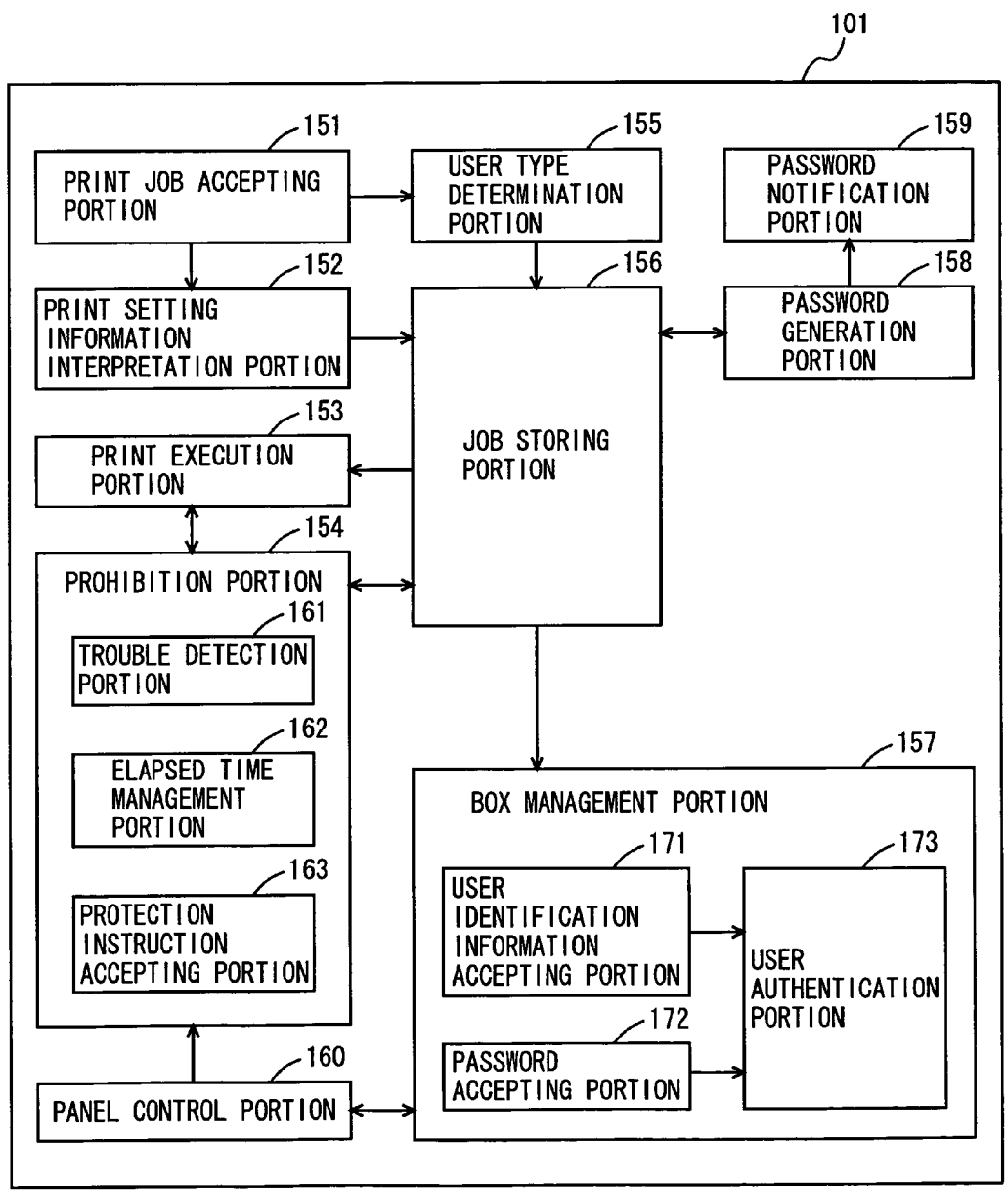
FIG. 5 is a functional block diagram showing an overall function of CPU of MFP.

FIG. 5 is a functional block diagram showing an overall function of CPU of MFP. With reference to FIG. 5, CPU 101 includes a print job accepting portion 151 accepting a print job, a print setting information interpretation portion 152 interpreting print setting information based on job information included in a print job, a print execution portion 153 allowing image formation portion 115 to perform image formation on print data included in a print job according to print setting information, a prohibition portion 154 prohibiting image formation portion 115 from performing image formation on print data, a user type determination portion 155 determining a user type based on job information included in a print job, a jot storing portion 156 temporarily storing a print job, a password generation portion 158 generating a password, a password notification portion 159 for transmitting a password to an apparatus that transmitted a print job, a box management portion 157 for managing a box formed in HDD 107, and a panel control portion 160 for controlling operation panel 119.

When the communication I/F receives print data and job information from PC 200, print job accepting portion 151 accepts the print data and the job information from the communication I/F. Print job accepting portion 151 outputs the accepted print data and job information to print setting information interpretation portion 152 and outputs user identification information included in the job information to user type determination portion 155. If user identification information is not included in the job information, user identification information is not output to user type determination portion 155.

Print setting information interpretation portion 152 interprets print data and job information to generate a print job including print data and a print condition and store them in job storing portion 156. Here, a print job stored in job storing portion 156 is referred to as a waiting job. Print execution portion 153 reads a waiting job stored in job storing portion 156 for execution. Specifically, image formation portion 115 is controlled such that print data is subjected to image formation according to a print condition. Print execution portion 153 does not read a waiting job while image formation portion 115 cannot be driven due to a trouble, while image formation portion 115 cannot be driven due to an error, or while a previous print job is being executed. Therefore, if a new print job is generated by print setting information interpretation portion 152 while image formation portion 115 cannot be driven due to a trouble, while image formation portion 115 cannot be driven due to an error, or while a previous print job is being executed, that print job is additionally stored in job storing portion 156. A trouble is a failure that cannot be repaired by the user of MFP 100, such as a damage on a photoconductive drum and a damage on a transfer roller. An error includes an event from which recovery can be made by the user of MFP 100, such as paper-out, exhaustion of consumables including toner shortage, and paper jam. If a plurality of waiting jobs are stored in job storing portion 156, print execution portion 153 reads and executes waiting jobs in order of storage.

Prohibition portion 154 includes a trouble detection portion 161, an elapsed time management portion 162, and a protection instruction accepting portion 163. Trouble detection portion 161 detects a trouble in MFP 100. Upon detection of a trouble in MFP 100, trouble detection portion 161 outputs to job storing portion 156 a signal prohibiting execution of all the waiting jobs stored therein. This is because in the event of a trouble, print execution portion 153 cannot execute a job for image formation.

Elapsed time management portion 162 counts the time elapsed since print data was accepted for each waiting job corresponding to that print data. If the elapsed time exceeds a predetermined threshold value, elapsed time management portion 162 outputs to job storing portion 156 job identification information for identifying a waiting job for which elapsed time exceeds the threshold value and a signal prohibiting execution of that waiting job. This aims to prevent such a waiting job from being subjected to image formation that is not executed even when a prescribed time has passed since print data was accepted, so that other people cannot see paper having an image of print data formed thereon. The threshold value is set in MFP 100 by an administrator. It is noted that the threshold value may be included in job information and the threshold value may vary among waiting jobs. In this case, the user of PC 200 who gives an instruction to transmit print data can define a threshold value.

When job identification information and a protection instruction are received from panel control portion 160 or communication I/F 111, protection instruction accepting portion 163 outputs to job storing portion 156 the job identification information and a signal prohibiting execution of a waiting job. When an instruction to display a list of waiting jobs is input to input portion 119A, panel control portion 160 displays job identification information for identifying each of all the waiting jobs stored in job storing portion 156 on display portion 119B. The job identification information includes a job number, user identification information of the user who transmitted a job, the time at which the job is accepted, and the like. When designation of job identification information and a protection instruction are input to input portion 119A, protection instruction accepting portion 163 accepts the designated job identification information and the protection instruction from input portion 119A. If MFP 100 is remotely operated from PC 200, panel control portion 160 transmits the same window as appearing on display portion 119B to PC 200 through communication I/F 111 and receives designation of job identification information and a protection instruction from PC 200 through communication I/F 111, similarly to when they are input to input portion 119A. When job identification information and a protection instruction are received by communication I/F 111, protection instruction accepting portion 163 accepts the job identification information and the protection instruction from communication I/F 111.

If user type determination portion 155 accepts user identification information from print job accepting portion 151, it outputs that user identification information to job storing portion 156. If user type determination portion 155 accepts no user identification information, it outputs user identification information indicating a guest user to job storing portion 156.

Job storing portion 156 relates a print job output by print setting information interpretation portion 152 with user identification information input from user type determination portion 155 and stores the job as a waiting job. When a signal prohibiting execution of a waiting job is input from prohibition portion 154, job storing portion 156 outputs a set of the stored waiting job and user identification information to box management portion 157. Job storing portion 156 outputs all the sets of waiting job and user identification information to box management portion 157 when a signal prohibiting execution of all the waiting jobs is input from prohibition portion 154. If job identification information and a signal prohibiting execution of a waiting job are input from prohibition portion 154, job storing portion 156 outputs a set of waiting job specified by that job identification information and user identification information to box management portion 157. In outputting a waiting job to box management portion 157, job storing portion 156 outputs a set of a waiting job and user identification information as well as a password to box management portion 157, if the waiting job is related with user identification information of a guest user. Job storing portion 156 asks password generation portion 158 to generate a password to obtain a password.

When asked by job storing portion 156 to generate a password, password generation portion 158 generates a password and outputs the generated password to job storing portion 156 and password notification portion 159.

Upon input of a password from password generation portion 158, password notification portion 159 transmits a set of job identification information for identifying a waiting job and the password to the apparatus that transmitted print data included in the waiting job. The waiting job is one of the waiting jobs stored by job storing portion 156 which is to be transmitted to box management portion 157. At the time of reception of a print job, print job accepting portion 151 obtains apparatus identification information for identifying the party at the other end, for example, an IP address, job storing portion 156 stores the IP address and the waiting job in relation with each other, and password notification portion 159 obtains the apparatus identification information of the apparatus that transmitted the waiting job from job storing portion 156.

If the accepted user identification information indicates a guest user, user authentication portion 173 does not authenticate the user identification information. If user identification information is not authenticated by user authentication portion 173, it is handled as a guest user by box management portion 157. Here, the authenticated user identification information is called authenticated user. Furthermore, of the authenticated users, the user whose registered user information, including user identification information, is stored in HDD 107 is specifically referred to as a registered user.

HDD 107 includes a personal storage area allocated for each user and a shared storage area allocated for a guest user. In the following, the personal storage area is referred to as a personal box and the shared storage area is referred to as a confidential box. Here, since user identification information "David" is registered in the registered user information in MFP 100, a personal box allocated to user identification information "David" is provided in HDD 107. Box management portion 157 permits access to the personal box allocated for user identification information "David" on condition that user identification information "David" is authenticated by user authentication portion 173. Access to a personal box is made by an operation input to operation panel 119 or by a remote operation from PC 200 through communication I/F 111. Therefore, a personal box can be accessed based on an operation by the authenticated user authenticated by user authentication portion 173.

Upon input of a set of a waiting job and user identification information from job storing portion 156, box management portion 157 stores the waiting job in the personal box allocated to user identification information in HDD 107, if registered user information including that user identification information is stored in HDD 107. If registered user information including user identification information is not stored in HDD 107, a home terminal is specified based on the user data including the user identification information, and the waiting job and user identification information are transmitted to that home terminal. At the home terminal receiving the waiting job and the user identification information, the waiting job is stored in a personal box related with the received user identification information. It is noted that if registered user information including user identification information is not stored, the similar process as for a guest user, which will be described below, may be performed without transmitting the waiting job and the user identification information to the home terminal.

Upon input of a set of a waiting job, user identification information of user identification information of a guest user and a password from job storing portion 156, box management portion 157 relates the waiting job and the password with each other and stores the waiting job in the confidential box provided in HDD 107. Box management portion 157 permits a guest user not subjected to user authentication to access to the confidential box in HDD 107. Here, if a waiting job stored in the confidential box is related with a password, access to that waiting job is permitted on condition that the same password as that password is input to password accepting portion 172.

Furthermore, box management portion 157 deletes a waiting job stored in a personal box if the same waiting job as the waiting job stored in the personal box is executed by print execution portion 153. This prevents the same job from being executed many times.

Figure 6:
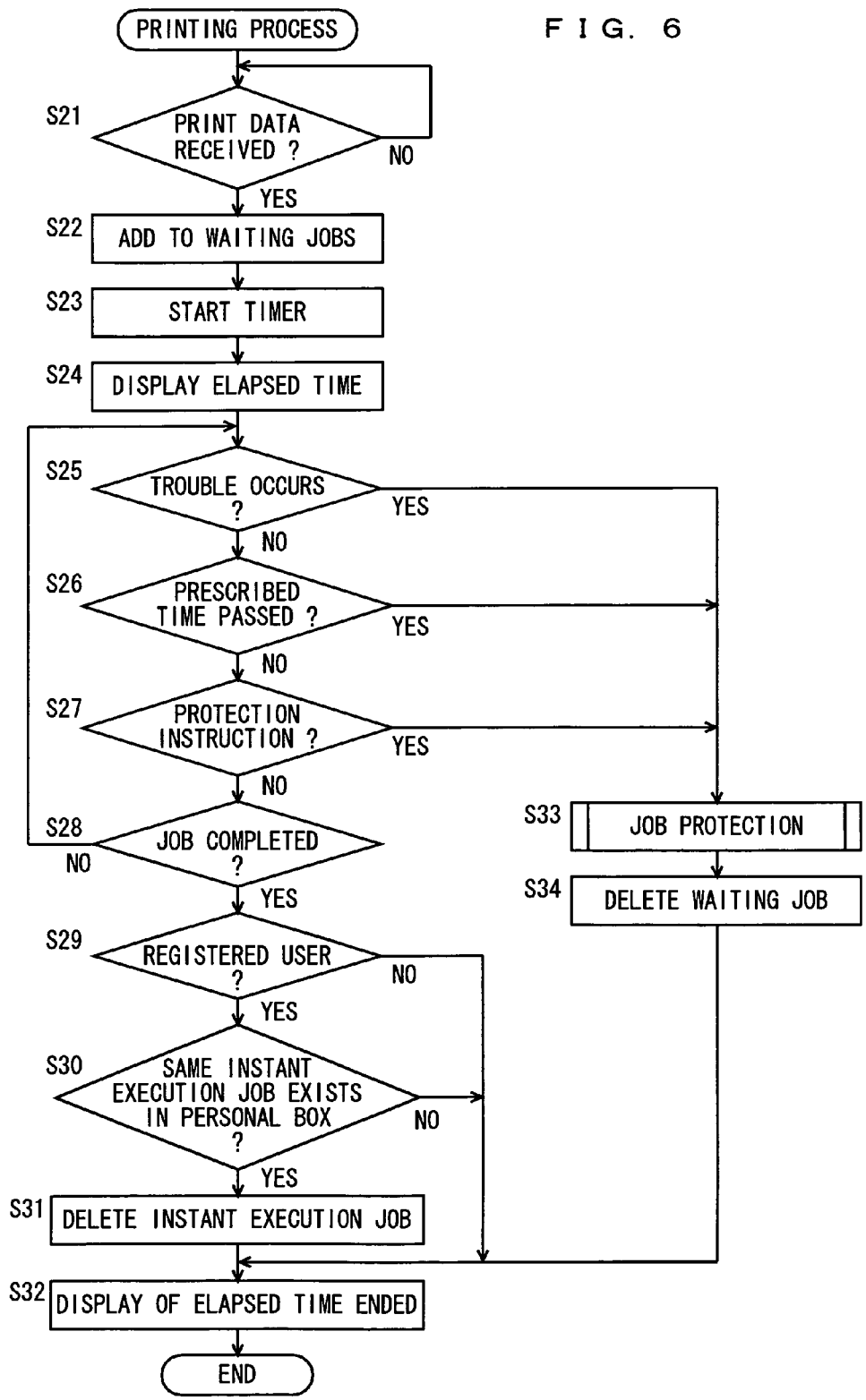
FIG. 6 is a flowchart illustrating an exemplary flow of a printing process.

FIG. 6 is a flowchart illustrating an exemplary flow of a printing process. The printing process is executed by CPU 101 of MFP 100 executing the print data output program. With reference to FIG. 6, CPU 101 determines whether or not print data is received (step S21). The stand-by state continues until print data is received (NO in step S21). If print data is received, the process proceeds to step S22 (YES in step S22). More specifically, the printing process is a process executed on condition that print data is received. In step S22, a print job is generated based on the received print data and the job information received therewith, and that print job is added to waiting jobs. Specifically, the print job is stored in job storing portion 156 as a waiting job.

Then, the timer is started (step S23). This timer counts the elapsed time since reception of print data. The timer is provided for each waiting job, and if a plurality of waiting jobs exist, the elapsed times since reception of print jobs are counted by a plurality of timers. Then, the elapsed time counted by the timer is displayed on display portion 119B (step S24). Thus, the user of MFP 100 can be notified of the elapsed time for each waiting job during stand-by. It is noted that the elapsed time may be transmitted to PC 200 so that the elapsed time is displayed on PC 200.

In step S25, it is detected whether or not any trouble occurs. If a trouble is detected, the process proceeds to step S33, and if not detected, the process proceeds to step S26. In step S26, it is determined whether or not the elapsed time counted by the timer exceeds a prescribed time. If the elapsed time exceeds it, the process proceeds to step S33, and if not exceeding, the process proceeds to step S27. In step S27, it is determined whether or not a protection instruction is accepted. When a user operates operation panel 119 to input designation of a waiting job and a protection instruction, the protection instruction is accepted. If the protection instruction is accepted, the process proceeds to step S33, and if not, the process proceeds to step S28.

In step S28, it is determined whether or not execution of a waiting job is completed. If the waiting job is completed, the process proceeds to step S29, and if not completed, the process returns to step S25.

In step S29, it is determined whether or not the user who transmitted print data is a registered user. If registered user information including user identification information included in the job information received with the print data is stored in HDD 107, the user is determined as a registered user, and if not, it is determined that the user is not a registered user.

If the user who transmitted a print job is a registered user, the process proceeds to step S30, and if not, the process proceeds to step S32. In step S30, it is determined whether or not an instant execution job is stored in the personal box allocated for the user who transmitted the print job. If an instant execution job is stored, the process proceeds to step S31, and if not, step S31 is skipped and the process proceeds to step S32. The instant execution job, which will be described later, is a waiting job stored in a personal box upon execution of a job protection process as described later. In step S32, display of the elapsed time, which was started in step S24, is ended, and the process then ends.

On the other hand, in step S33, a job protection process is executed, and the process proceeds to step S34. In step S34, the waiting job stored in job storing portion 156 is deleted. This prohibits the waiting job from being subjected to image formation. This aims to prevent a waiting job from being subjected to image formation without the user being aware of it.

The process proceeds to step S33 in any of the following cases: if a trouble occurs before print data is subjected to image formation; if a prescribed time has passed since print data was received; and if a user operates operation panel 119 to input a protection instruction. Time is sometimes required between transmission of print data and execution of a job generated from that print data. In such a case, a user who gives an instruction to perform image formation on print data cannot pick up the output paper when moving to the installation place of MFP 100 to pick up the output paper. The instruction to print data cannot be changed since it has already been issued. However, the paper having print data subjected to image formation can be prevented from being seen by other people since the job is protected in step S33.

Figure 7:
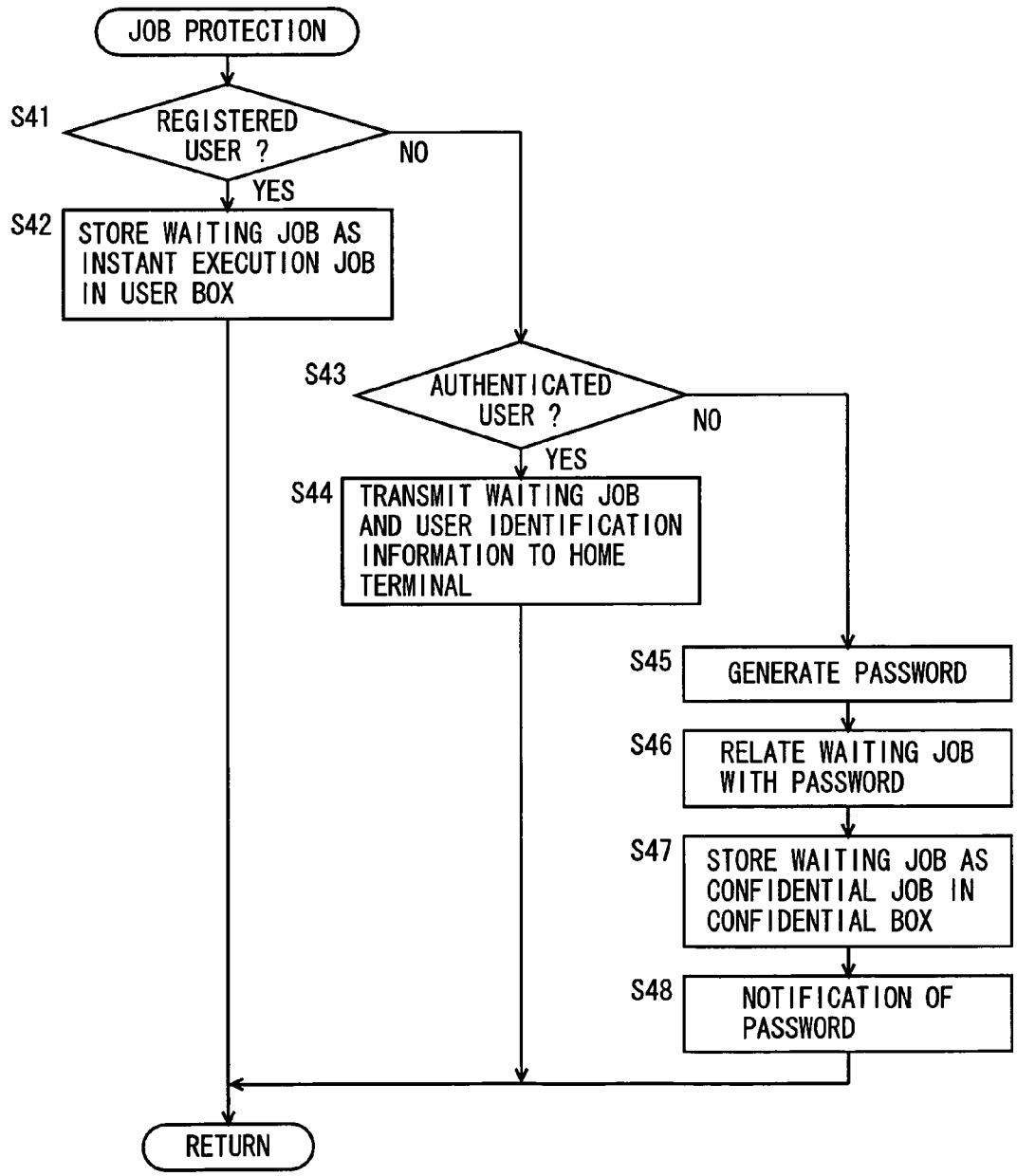
FIG. 7 is a flowchart illustrating an exemplary flow of a job protection process.

FIG. 7 is a flowchart illustrating an exemplary flow of a job protection process. The job protection process is a process executed in step S33 of FIG. 6. With reference to FIG. 7, it is determined whether or not the user who transmitted a print job is a registered user (step S41). If the user who transmitted a print job is a registered user, the process proceeds to step S42, and if not, the process proceeds to step S43. In step S42, the waiting job is stored as an instant execution job in a personal box, and then the process returns to the printing process.

Print data is stored as an instant execution job rather than as a normal job for the following reasons. Specifically, this print job should be protected in the circumstance in which confidentiality is not assured, although an instruction of printing has already been issued. Then, when the user operates an apparatus next time, specifically, when the user operates the operation panel to input user identification information, is authenticated, and then logs in, the previous print instruction is valid even without a print instruction operation, assuming that confidentiality is assured. Therefore, the operation procedure for the user is simplified with increased convenience. In order to differentiate an instant execution job from a normal job, a variety of methods may be employed. For example, such information is described in job information, a flag is set, or a mark as an instant execution job is provided.

FIG. 8 is a diagram showing a job management table stored in a personal box by way of example. With reference to FIG. 8, print data is stored in association with a job number, and managed as job management information thereof are owner information such as user identification information/password, the accepting date and time at which it is stored in a personal box, job information indicating job conditions, and information indicating whether or not it is an instant execution job. Here, if print data is stored as an instant execution job, * mark is put in the field of the instant execution job of the job management information. When the user operates the operation panel to log in the apparatus next time, the waiting job with this * mark is searched for, and if the corresponding one exists, it is read and printing is automatically done.

Returning to FIG. 7, in step S42, the personal box storing an instant execution job is a personal box allocated in HDD 107 for the user who transmitted print data. In other words, it is a personal box allocated beforehand for user identification information included in the job information received together with print data. Since a waiting job is stored in a personal box, it is possible to prevent print data from being subjected to image formation before the user who gave an instruction of printing is aware, and to make print data ready for image formation as desired by the user. In addition, since a password is required to access a waiting job stored in a personal box, it is possible to prevent print data from being seen by other people.

In step S43, it is determined whether or not the user who transmitted a print job is an authenticated user. If the user who transmitted print data is an authenticated user, the process proceeds to step S44, and if not, the process proceeds to step S45. Specifically, if there exists user data including user identification information included in the job information received together with the print data, the user is determined as an authenticated user. If not, it is determined that the user is not an authenticated user. Here, a user other than a registered user is determined as an authenticated user. In other words, if the user who transmitted print data is an authenticated user other than a registered user, the process proceeds to step S44. Instead, if the user is a guest user, the process proceeds to step S45.

In step S44, a waiting job and user identification information are transmitted to a home terminal. A home terminal is specified based on user data including user identification information included in the job information received together with the print data, so that the waiting job and the user identification information are transmitted to that home terminal. At the home terminal receiving the waiting job and the user identification information, that waiting job is stored as an instant execution job in a personal box allocated in HDD 107 for the received user identification information. Accordingly, it is possible to prevent print data from being subjected to image formation before the user who gave an instruction of printing becomes aware and to make print data ready for image formation as desired by a user.

In step S45, a password is generated. A password may be, for example, a plurality of character strings which are arbitrarily extracted from alphanumerics. Then, the waiting job is related with the generated password (step S46), and the waiting job is then stored as a confidential job in the confidential box (step S47). Accordingly, it is possible to prevent print data from being subjected to image formation before the user who gave an instruction of printing becomes aware, and to make print data ready for printing as desired by the user. Although user authentication is not required to access the confidential box, a password is required to access a waiting job as the waiting job is stored in relation with the password. Therefore, the user who can access to the waiting job can be limited to the one who knows the password.

Therefore, the generated password is transmitted to the apparatus that transmitted print data (step S48), and the process returns to the printing process. When print data is received, the IP (Internet Protocol) address of the apparatus that transmitted it is received, so that the password can be transmitted to that IP address. Therefore, the user who gave an instruction to transmit print data can be notified of a password for execution of a confidential job.

Figure 9:
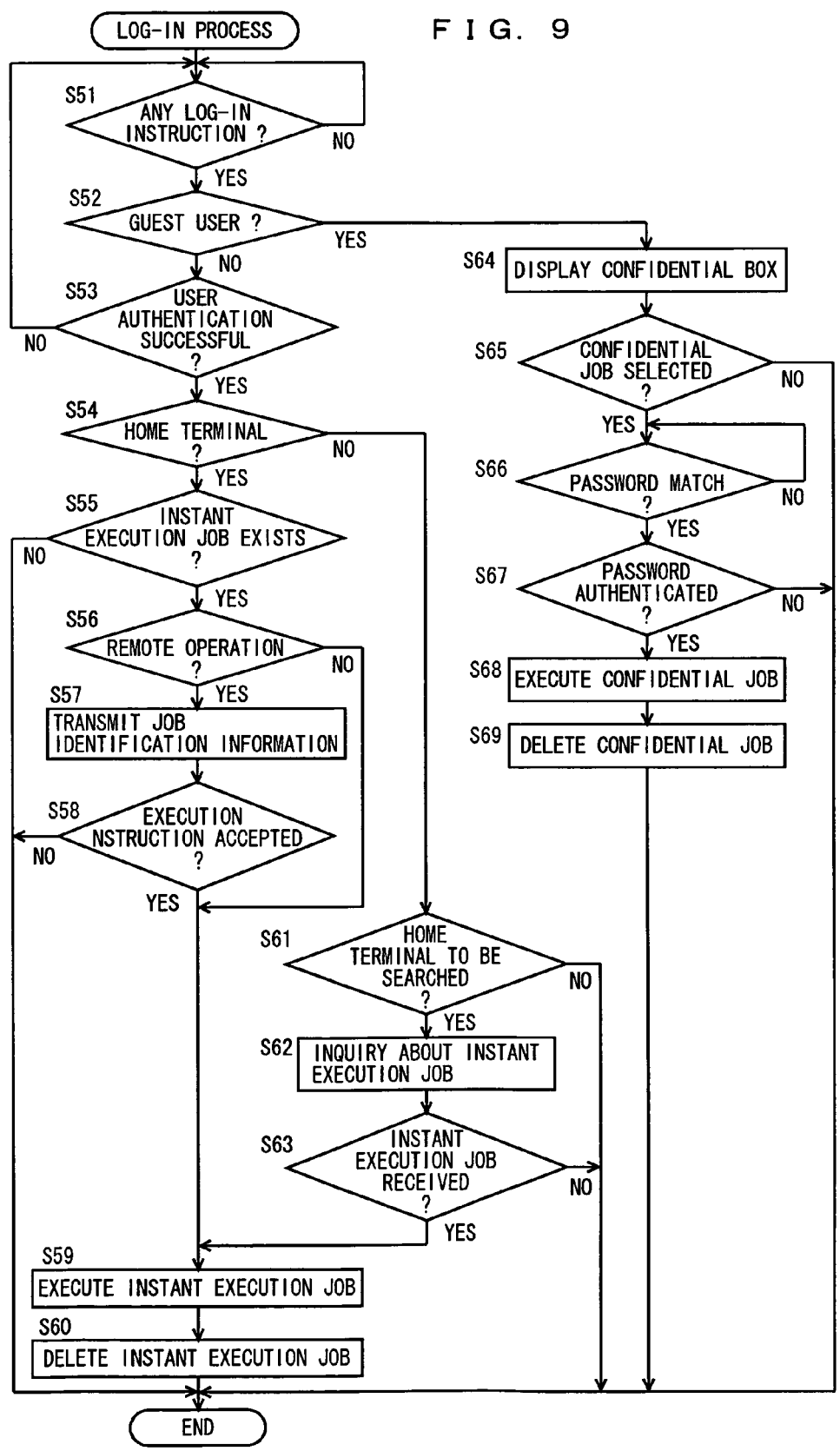
FIG. 9 is a flowchart illustrating an exemplary flow of a log-in process.

FIG. 9 is a flowchart illustrating an exemplary flow of a log-in process. The log-in process is a process executed by CPU 101 of MFP 100 executing the print data output program. With reference to FIG. 9, CPU 101 determines whether or not a log-in instruction is accepted (step S51). A log-in window for accepting inputs of user identification information and a password appears on display portion 119B, and when user identification information and a password are input through input portion 119A, it is determined that a log-in instruction is accepted. Furthermore, when user identification information and a password are received through a remote operation from PC 200, it is determined that a log-in instruction is accepted. Then, it is determined whether or not the user identification information indicates a guest user (step S52), if a guest user is indicated, the process proceeds to step S64, and if not a guest user, the process proceeds to step S53. In step S53, user identification information is authenticated and it is determined whether or not the authentication is successful. If the authentication is successful, the process proceeds to step S54. If the authentication is failed, the process returns to step S51. In step S54, it is determined whether or not the log-in user has logged in to a home terminal. Specifically, if registered user data including the user identification information is stored in HDD 107, it is determined that the log-in user is a registered user who has logged in to the home terminal, and the process proceeds to step S55. If not, it is determined that the log-in user is an authenticated user who has logged in to a terminal other than the home terminal, and the process proceeds to step S60.

In step S55, it is determined whether or not an instant execution job exists. Specifically, it is determined whether or not an instant execution job is stored in the personal box allocated for the user identification information accepted in step S51. If an instant execution job is stored, the process proceeds to step S56, and if it is not stored, the process ends.

In step S56, it is determined whether or not a log-in instruction is given through a remote operation. If a log-in instruction is received from PC 200, the process proceeds to step S57, and if it is input from input portion 119A, the process proceeds to step S59. In step S57, the job identification information for identifying an instant execution job stored in the personal box allocated for the user identification information accepted in step S51 is transmitted to PC 200 which transmitted the log-in instruction. At PC 200, the job identification information is received and then displayed in a list. PC 200 accepts a selection of a job and an execution instruction from a user and then transmits the selected job identification information and a command to give an instruction for execution to MFP 100.

In step S58, it is determined whether or not the job identification information and the command to give an instruction for execution are received from PC 200. If received, the process proceeds to step S59, and if not received, the process ends. Therefore, if MFP 100 is logged in to from PC 200 through a remote operation, the instant execution job stored in a home terminal can be selected and executed.

In step S59, an instant execution job is executed. Since the instant execution job is executed, print data that was transmitted previously and has not been subjected to image formation is subjected to image formation. Since an instant execution job is executed upon log-in to a home terminal, an operation to execute an instant execution job needs not be input, thereby simplifying the operation. If there are a plurality of instant execution jobs, a plurality of instant execution jobs are executed one by one.

In the next step S34, the executed instant execution job is deleted from the personal box. This prevents an instant execution job from staying stored in a personal box for a long time and prevents an instant execution job from being executed every time a home terminal is logged in.

If the process proceeds to step S61, the log-in user is an authenticated user. In the job protection process as described above, the instant execution job is stored in a personal box of a home terminal, so that the instant execution job corresponding to the authenticated user is not stored in the log-in terminal. Therefore, in step S61, it is determined whether or not an instant execution job stored in a home terminal which is a different apparatus connected via network 2 is searched for. Whether or not a home terminal is searched may be preset in MFP 100 or may be selected by the user in step S61. If it is determined that a home terminal is to be searched, the process proceeds to step S62, and if not, the process ends. It is possible to respect the user's intention not to execute an instant execution job at a terminal other than the home terminal.

In step S62, an inquiry about an instant execution job is made to the home terminal which is a different apparatus connected via network 2. Specifically, a request to transmit an instant execution job including user identification information is transmitted to the home terminal of the log-in user. At the home terminal, upon reception of the request to transmit an instant execution job, the personal box allocated for the user identification information included in the transmission request is searched. If an instant execution job is stored, that instant execution job is sent back, and if an instant execution job is not stored, a signal is sent back to indicate that no instant execution job exists. If the instant execution job is transmitted, that instant execution job is deleted from HDD 107.

In step S63, it is determined whether or not an instant execution job is received, and if it is received, the process proceeds to step S59. If it is not received, the process ends. When the process proceeds to step S59, the instant execution job received from the home terminal is executed and therefore print data that was transmitted previously and has not been subjected to image formation is subjected to image formation. Thus, when a terminal other than a home terminal is logged in, an instant execution job is executed, so that an instant execution job can be executed as long as any of MFPs 100, 100A, 100B, 100C is logged in. In addition, no special operation is required to execute an instant execution job, thereby simplifying an input of an operation.

On the other hand, in step S64, confidential jobs stored in the confidential box are displayed in a list. Specifically, job identification information of confidential jobs is listed and displayed on display portion 119B. Then, it is determined whether or not one of the displayed job identification information is selected (step S65), and if selected, the process proceeds to step S66. If not selected, the process ends. In step S66, the stand-by state continues until a password is input (NO in step S66). When a password is input, the process proceeds to step S67. A password input window for accepting an input of a password appears on display portion 119B. When a password is input to input portion 119A, that password is accepted.

Then, it is determined whether or not the input password matches the password related with the confidential job selected in step S65 (step S67). If both match each other, the process proceeds to step S68, and if they do not match, the process ends. In step S68, the confidential job selected in step S65 is executed. A confidential job is stored in relation with a password, and the confidential job is executed on condition that that password is input. Therefore, it is possible to prevent other people from executing a confidential job and pick up paper having print data subjected to image formation thereon. Thus, it is possible to prevent leakage of confidential information included in print data.

In the next step S69, the executed confidential job is deleted from the confidential box (step S69). This can prevent a confidential job from staying stored in the confidential box.

As described above, MFP in accordance with the present embodiment prohibits print data from being subjected to image formation and stores print data in a personal box or stores print data in relation with a password in a confidential box before the received print data is subjected to image formation, when a prescribed time has passed since print data was received or when an input of an instruction to protect print data is accepted. Therefore, when the user who gave an instruction to transmit print data moves to an image forming apparatus as believing that print data, which is not yet output, was subjected to image formation, and thereafter moves away from the image forming apparatus, paper having print data subjected to image formation is not seen by other people, because the print data is not subjected to image formation. Thus, leakage of confidential information can be prevented. In particular, if print data related with user identification information is protected, when the user operates the operation panel for log-in next time, the print data is protected as an instant execution job in which printing is automatically started in the logged-in apparatus. Therefore, the user needs not newly perform a job selection operation for printing instruction or a job execution instruction operation, thereby simplifying the user's operation procedure and improving the convenience.

Furthermore, when the user logs in to any of MFPs 100, 100A, 100B, 100C, print data stored in a personal box is subjected to image formation so that the user who gave an instruction to transmit print data can pick up paper having the print data subjected to image formation later.

In addition, when print data is stored in a confidential box, it is stored in relation with a password. This can prevent print data from being seen by other people. Moreover, the password related with print data is transmitted to the apparatus that transmitted the print data, so that the user who gave an instruction to transmit print data can obtain the password. The user who gave an instruction to transmit print data inputs the password to allow the print data stored in the confidential box to be subjected to image formation.

It is noted that although, in the present embodiment, an instant execution job is stored in a personal box of a home terminal, the present invention is not limited thereto. For example, an instant execution job may be stored in relation with user identification information in any of the apparatuses included in the same network group, and when the user inputs the user identification information into another apparatus for authentication, the instant execution job related with that user identification information may be broadcasted for inquiry from that apparatus to each apparatus in the same network group, so that the instant executed job is searched for and received.

Furthermore, although, in the embodiment described above, description has been made to MFPs 100, 100A, 100B, 100C and image processing system 1, it is needless to say that the present invention can be understood as a print data output method and a print data output program executed by each of MFPs 100, 100A, 100B, 100C.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing system including a plurality of image forming apparatuses each connected to a network, each of said plurality of image forming apparatuses including:
a print data reception portion to receive print data and user identification information for identifying a user;
an image forming portion to perform image formation on print data;
a prohibition portion to prohibit said image forming portion from performing image formation on said received print data, relate said print data with the user identification information received together with said print data, and store said received print data in a storage device before said received print data is subjected to image formation by said image forming portion, when a prescribed time has passed since said print data was received or when an input of
an instruction to protect said print data is accepted;
an operation accepting portion to accept an input of an operation by a user;
an authentication portion to authenticate the user identification information accepted by said operation accepting portion;
a print data obtaining portion to obtain print data related with said authenticated user identification information from another image forming apparatus connected via said network; and
an output portion to allow said image forming portion to perform image formation on said print data obtained by said print data obtaining portion.

2. The image processing system according to claim 1, wherein
said storage device includes a personal storage area which is related with each of a plurality of user identification information and to which access is permitted on condition that user identification information is authenticated by said user authentication portion, and
said prohibition portion includes a relation portion to store said print data into said personal storage area related with the user identification information received together with said print data.

3. A print data output method executed in each of a plurality of image forming apparatuses connected to a network,
each of said plurality of image forming apparatuses including
a storage device, and
an image forming portion to perform image formation on print data, said method comprising the steps of:
in inputting print data,
receiving print data and user identification information for identifying a user;
prohibiting said image forming portion from performing image formation on said received print data before said received print data is subjected to image formation by said image forming portion, when a prescribed time has passed since said print data was received or when an input of an instruction to protect said print data is accepted; and
relating said print data with the user identification information received together with said print data and storing said received print data; and
in outputting print data,
accepting an input of user identification information;
authenticating said accepted user identification information;
obtaining the print data related with said authenticated user identification information from another image forming apparatus connected via said network; and
allowing said image forming portion to perform image formation on said obtained print data.

4. A computer-readable medium storing a print data output program product executed in each of a plurality of image forming apparatuses connected to a network,
each of said plurality of image forming apparatuses including
a storage device, and
an image forming portion to perform image formation on print data, said program product causing said image forming apparatus to execute the steps of:
in inputting print data,
receiving print data and user identification information for identifying a user;
prohibiting said image forming portion from performing image formation on said received print data before said received print data is subjected to image formation by said image forming portion, when a prescribed time has passed since said print data was received or when an input of an instruction to protect said print data is accepted; and
relating said print data with the user identification information received together with said print data and storing said received print data; and
in outputting print data,
accepting an input of user identification information;
authenticating said accepted user identification information;
obtaining the print data related with said authenticated user identification information from another image forming apparatus connected via said network; and
allowing said image forming portion to perform image formation on said obtained print data.

5. An image processing system including a plurality of image forming apparatuses each connected to a network,
each of said plurality of image forming apparatuses including:
a print data reception portion to receive print data and user identification information for identifying a user;
an image forming portion to perform image formation on print data;
a prohibition portion to prohibit said image forming portion from performing image formation on said received print data, relate said print data with the user identification information received together with said print data, and store said received print data in a storage device before said received print data is subjected to image formation by said image forming portion, when a prescribed time has passed since said print data was received;
an operation accepting portion to accept an input of an operation by a user;
an authentication portion to authenticate the user identification information accepted by said operation accepting portion;
a print data obtaining portion to obtain print data related with said authenticated user identification information from another image forming apparatus connected via said network; and
an output portion to allow said image forming portion to perform image formation on said print data obtained by said print data obtaining portion.

6. The image processing system according to claim 5, wherein said storage device includes a personal storage area which is related with each of a plurality of user identification information and to which access is permitted on condition that user identification information is authenticated by said user authentication portion, and said prohibition portion includes a relation portion to store said print data into said personal storage area related with the user identification information received together with said print data.

7. A print data output method executed in each of a plurality of image forming apparatuses connected to a network, each of said plurality of image forming apparatuses including a storage device, and an image forming portion to perform image formation on print data, said method comprising the steps of:

in inputting print data, receiving print data and user identification information for identifying a user;

prohibiting said image forming portion from performing image formation on said received print data before said received print data is subjected to image formation by said image forming portion, when a prescribed time has passed since said print data was received; and relating said print data with the user identification information received together with said print data and storing said received print data; and in outputting print data, accepting an input of user identification information;

authenticating said accepted user identification information;

obtaining the print data related with said authenticated user identification information from another image forming apparatus connected via said network; and allowing said image forming portion to perform image formation on said obtained print data.

8. A computer-readable medium storing a print data output program product executed in each of a plurality of image forming apparatuses connected to a network, each of said plurality of image forming apparatuses including a storage device, and an image forming portion to perform image formation on print data, said program product causing said image forming apparatus to execute the steps of:

in inputting print data, receiving print data and user identification information for identifying a user;

prohibiting said image forming portion from performing image formation on said received print data before said received print data is subjected to image formation by said image forming portion, when a prescribed time has passed since said print data was received; and relating said print data with the user identification information received together with said print data and storing said received print data; and in outputting print data, accepting an input of user identification information;

authenticating said accepted user identification information;

obtaining the print data related with said authenticated user identification information from another image forming apparatus connected via said network; and allowing said image forming portion to perform image formation on said obtained print data.

* * * * *